Oct. 18, 1938.   A. A. SCOTT, JR   2,133,906
BUTTON MAKING MACHINE
Filed April 18, 1936   3 Sheets-Sheet 1

Fig. 1.

Inventor
Alexander A. Scott, Jr.
By Cyrus Kehr
Attorney

Oct. 18, 1938. A. A. SCOTT, JR 2,133,906
BUTTON MAKING MACHINE
Filed April 18, 1936 3 Sheets-Sheet 2

Inventor
Alexander A. Scott, Jr
By Cyrus Kehr
his Attorney

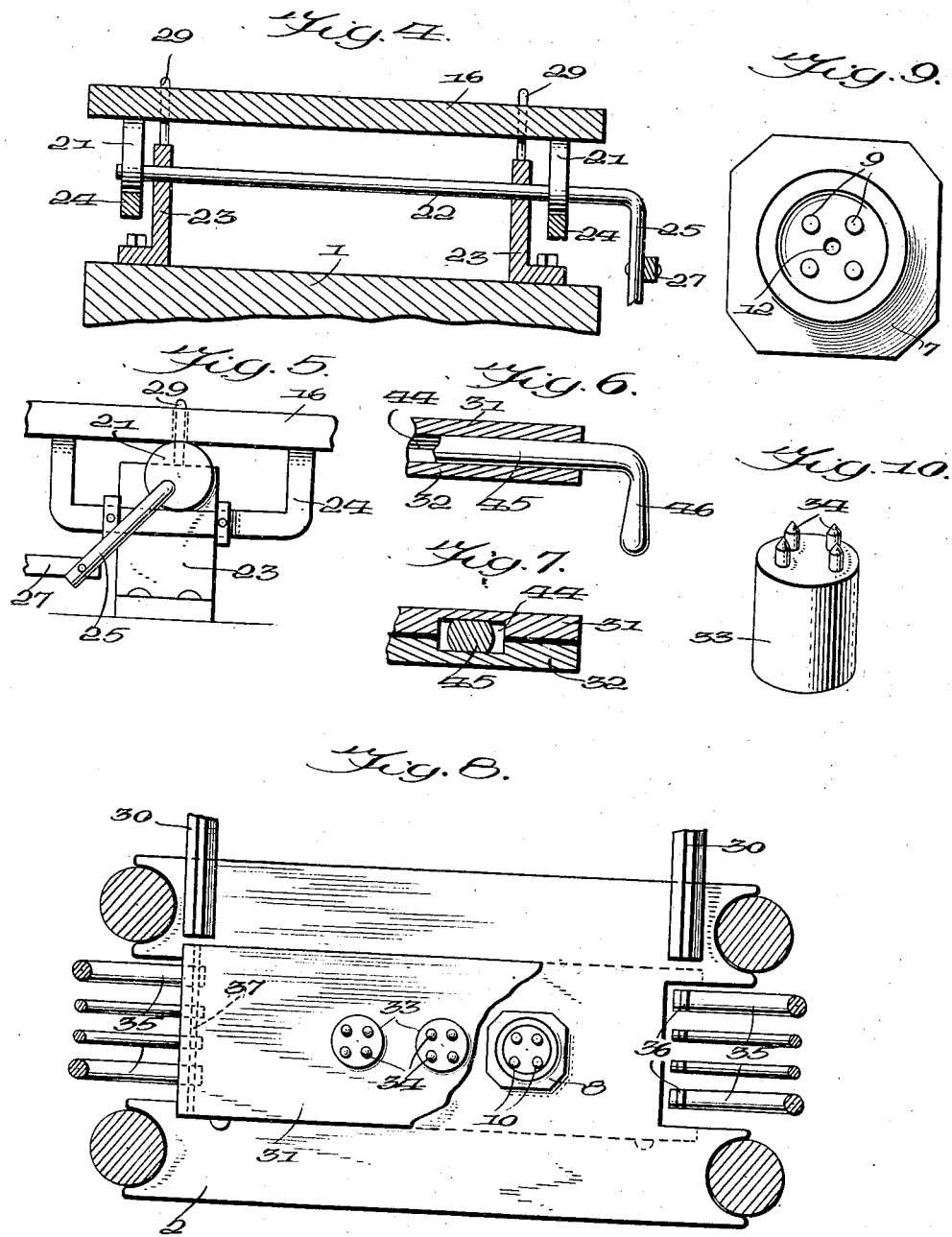

Patented Oct. 18, 1938

2,133,906

UNITED STATES PATENT OFFICE 2,133,906

BUTTON MAKING MACHINE

Alexander A. Scott, Jr., Townsend, Tenn., assignor to The Patent Button Company of Tennessee, Townsend, Tenn., a corporation of Tennessee Application April 18, 1936, Serial No. 75,202

12 Claims. (Cl. 18—16)

This invention relates to an improvement in process and apparatus for molding buttons, and more particularly to the molding of buttons or like products from synthetic gum resins by a compressing action between molds.

In molding machines which have been used heretofore, the equipment for ejecting the buttons or other articles from the molds, has been objectionable, principally because of the use of short ejecting pins that must be removed and replaced in groups.

One object of the present invention is to improve the ejecting equipment whereby ejecting rods are provided that may be individually adjusted, removed, or replaced, which rods extend through the press head of the molding mechanism, which greatly improves the machine.

Another object of the present invention is to improve the method of piercing and cleaning the molded holes of the buttons (the thread holes), to remove the thin layer or web of material thereacross. In the present invention, while the buttons are impaled on the hole-forming projections of the molds, receiving mechanism is moved up to meet the mold, and immediately the buttons are ejected from the mold and impaled on the receiving mechanism within the confines of the press and while thus on the receiving mechanism other finishing steps may be performed on the buttons.

The process and apparatus for molding buttons and like products are greatly simplified and improved in the present invention, which embodies several improved features in the apparatus that will be apparent from the following description and claims.

I have illustrated a preferred embodiment of my invention in the accompanying drawings, in which:

Fig. 1 is a side elevation of the complete apparatus;

Fig. 4 is a detail sectional view substantially on the line 4—4, of Fig. 1;

Fig. 5 is a detail side elevation of the ejecting rod operating mechanism;

Fig. 6 is a detail sectional view through the receiving plate assembly;

Fig. 7 is a transverse sectional view thereof;

Fig. 8 is a horizontal sectional view with parts broken away, substantially on the line 8—8 of Fig. 1;

Fig. 9 is a bottom plan view of a top form; and

Fig. 10 is a perspective view of one of the piercing units detached.

Figure 2:
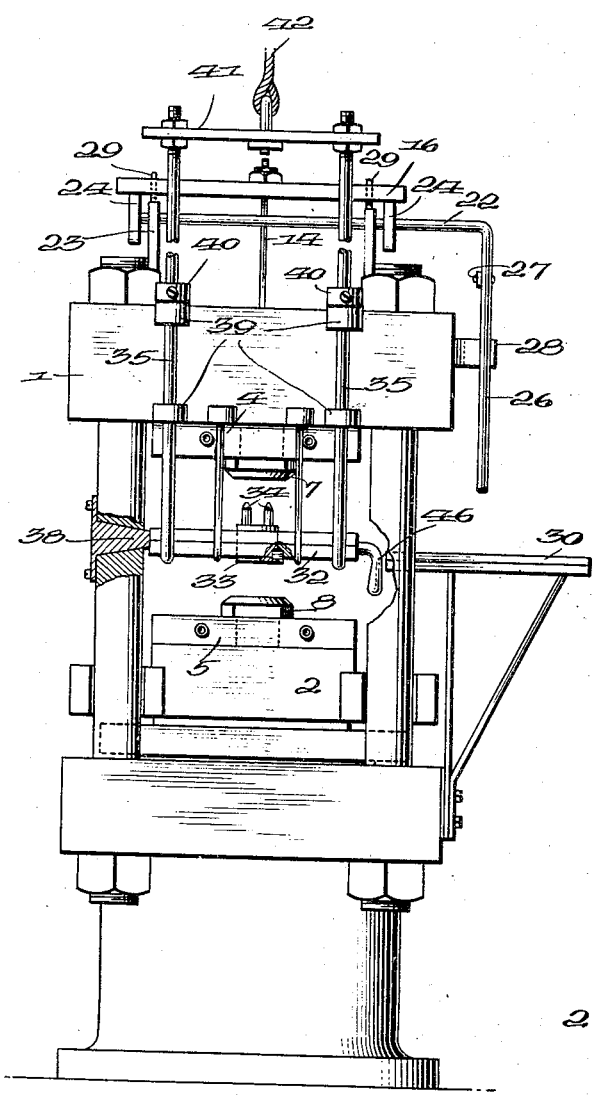
Fig. 2 is an end elevation thereof, partly in section.

The present invention is shown as applied to a conventional hydraulic press, which has the usual fixed and movable heads 1 and 2, the latter being carried on the upper end of a ram 3, which is moved up by fluid pressure, the movements of which are manually controlled in the usual manner.

Secured to the heads 1 and 2 are hot plates 4 and 5, respectively, which are heated by circulating steam therethrough from heating pipes 6. This in turn serves to heat the molds that are mounted in these hot plates 4 and 5.

The hot plates 4 and 5 are shown as having series of molds 7 and 8 mounted therein, respectively, the size of which molds is somewhat exaggerated for the sake of clearness and only three molds being shown in each hot plate, whereas, ordinarily, there would be a considerable number, up to approximately 225 pairs of molds used in a single press, but the number may vary as desired. The molds 7 and 8 are shaped to form the back and front sides, respectively, of the buttons.

Figure 3:
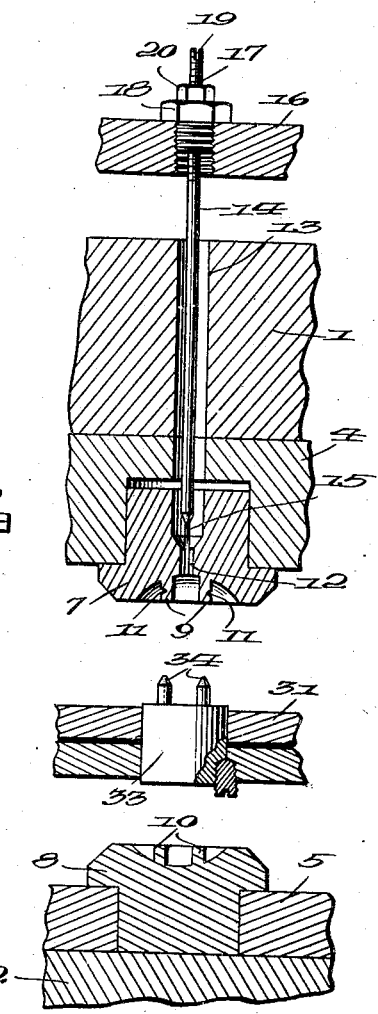
Fig. 3 is a vertical sectional view through the molding and ejecting mechanism taken substantially on the line 3—3 of Fig. 1.

As shown in Fig. 3, each of the molds 7 and 8 has a reduced portion for securing the same in the hot plates 4 and 5. The molds 7 and 8 have projections 9 and 10 therein, respectively, which projections are arranged in vertical alignment so that when the molds are moved together to form a button therebetween, the projections 9 and 10 form the thread holes in the button. The projections 9 have slight notches 11 in the sides thereof, as shown in Fig. 3, so that when the molds are separated, the formed buttons will be retained temporarily in the upper molds 7, until ejected.

The molds 7 have small holes 12 drilled through the centers thereof registering with aligned but somewhat enlarged holes 13 drilled through the hot plate 4 and press head 1, forming a continuous hole therethrough. In each of these holes 12, 13, an ejecting rod 14 is suspended, which rod has a reduced lower end 15 received in the hole 12 and normally located with its lower end at the lower end of the hole 12, substantially closing said hole but in position to eject the molded button from the mold 7. The ejecting rods 14 are suspended from a plate 16, and provision is made for adjusting the rods relative to the plate in order to locate the reduced end 15 of the ejecting rod in proper relation to the mold 7. For this purpose, each of the ejecting rods 14 has the upper end thereof threaded, as at 17, and screwed into an adjusting head 18, which in turn is screw-threaded into the plate 16. The extreme upper end of the ejecting rod 14 has a screw driver slot 19 for turning the same, and a lock nut 20 is screwed onto the threaded portion 17, for locking the ejecting rod in proper position relative to the plate 16, and accordingly in proper position relative to mold 7.

The plate 16 is supported on four cams 21, shown in Figs. 1, 4, and 5, which cams 21 are mounted in pairs on cross shafts 22 which are in turn supported by brackets 23 carried by the top press head 1. Guides 24 extend about the undersides of the cams 21, so that the plate 16 will be moved up and down upon turning movements of the cams 21. As shown in Fig. 1, the cross shafts 22 have short and long arms 25 and 26, mounted thereon, respectively, and connected together by a connecting rod 27. The arm 26 is adapted to be manually actuated but normally rests against a stop 28, shown in Fig. 1. The parts are shown in their normal positions with the plate 16 and the ejecting rods carried thereby in their elevated positions, but when the long arm 26 is swung up in the direction of the arrow in Fig. 1, the cams 21 will be turned so as to lower the ejecting rods. Guide pins 29 extend upwardly from the brackets 23 through holes in the plate 16 to prevent horizontal displacement of the plate during the up and down motions described.

In molding buttons or similar products from synthetic gum resins, or the like, the molding process requires a pressure of about 2000 pounds per square inch for approximately one minute, with the molds heated approximately to 350° F. The raw molding material in the shape of compressed pellets is placed in the bottom molds 8, after which pressure is applied to the ram 3 by the usual pump to force the molds 8 toward the molds 7, during which movement the receiving assembly shown in the drawings as between the molds, has been removed to a point without the confines of the press. The press shapes the molding material to form the front and back sides of the buttons with the thread holes therein, which would be formed by the projections 9 and 10, during which molding operation the ejecting rods 14 are in their upper positions, as shown in Fig. 3, with their lower ends flush with the inner surfaces of the top molds 7, being initially adjusted and locked in this position. After the molding process is completed and the molds 7 and 8 separated, the buttons would remain in the top molds because of the notches 11 in the sides of the projections 9, but these notches are only sufficient to hold the buttons temporarily and the joints are easily broken by the lowering of the ejecting rods 14.

Tracks 30 extend from one side of the press and during the molding process the receiving assembly normally rests on these tracks. The receiving assembly comprises plates 31 and 32, the plate 32 having fixed therein piercing units 33, one of which is shown in Fig. 10, which piercing units are arranged to align with the molds 7 and each piercing unit has a plurality of prongs 34, of the same number, size, and spacing as the holes formed in the molded button. There is a piercing unit for each top mold and each piercing unit is set so that each of its prongs is directly under the corresponding hole-forming projection of the top mold over it.

When the molding process has been completed, and the press opened, as above described, the receiving assembly is pushed from its outside position on the tracks 30 into the receiving position, shown in the drawings, where the assembly is supported on lifting arms 35; each lifting arm 35 has a rib 36 thereon which fits in a groove 37 in the underside of plate 32, to guide the receiving assembly to its proper position against a stop 38, which locates the receiving assembly and piercing units in proper positions relative to the molds 7.

The lifting arms 35 extend upwardly through guides 39 on the press head 1, being normally supported in their lower positions by stop members 40 on the arms 35, and the upper ends of the arms 35 are attached to a lifting plate 41, which is carried by a cable 42, extending over suitable pulleys to a treadle 43. Normally the lifting plate 41 would be disposed a substantial distance above the plates 16, at least sufficient to permit the individual removal of the ejecting rods 14 therebetween.

As the hole-forming projections of the bottom molds correspond with the hole-forming projections of the top molds, the buttons adhering to which correspond with the prongs 34 of the receiving assembly when the latter is brought to its receiving position in the open press, as shown in the drawings. By depressing the treadle 43, the lifting plate 41 is raised, as well as the lifting arms 35, which lift the receiving assembly until each of its prongs enters the corresponding molded hole in the button above it. While holding the receiving assembly in its topmost position, the arm 26 is moved to the left from the position shown in Fig. 1 which depresses the ejecting rods 14, the lower ends 15 of which eject the buttons from the top molds and impales them upon the prongs 34 of the piercing units 33. Foot treadle 43 is released then, allowing the receiving assembly to return by gravity to its lower position, shown in the drawings, which is governed by the stops 40 and guide members 39, in which position the receiving assembly is substantially in alignment with the track 30 upon which it is drawn with the buttons impaled on the prongs.

Stripper plate 31, rests on plate 32, between which plates are formed elongated openings 44 within which cam levers 45 are disposed and having handles 46 for turning the same after the receiving assembly has received its load of buttons and has been drawn out on the tracks 30, the lever 46 being given a quarter turn, which raises the stripper plate 31 level with the ends of the prongs 34, thereby disengaging the buttons from the piercing units, and the buttons may be brushed off then from the stripper plate into a suitable container. If desired, while the buttons are impaled on the piercing units, any other finishing work may be performed thereon. The ejecting of the buttons from the molds onto the prongs of the piercing units cleans the molded holes of the buttons and removes the thin layer or web of material from across the holes where the hole-forming projections of the top and bottom molds met in forming the buttons. This makes it unnecessary to pierce the buttons after leaving the press and greatly simplifies the finishing and removal of the buttons.

It is evident from the foregoing description that the ejecting rods 14 may be removed lengthwise from the plate 16 between the latter and the lifting plate 41 for replacement of these ejecting rods, if desired. At the same time, the individual mounting of the ejecting rods in the plate 16 permits ready adjustment thereof, so as to locate the lower ends 15 at the inner ends of the molds, in proper positions for ejecting the buttons.

I claim:

1. In a button-making machine, a receiving assembly comprising a plate having a plurality of impaling button supports thereon, and means movable laterally relative to the plate for displacing the buttons from said impaling supports.

2. In a molding machine, a receiving assembly comprising a support having a plurality of units, each unit having a plurality of impaling prongs arranged to impale a molded product.

3. In a molding machine, a receiving assembly comprising a support having a plurality of units having impaling prongs arranged to impale molded products, and means movable relative to the support for displacing the molded products from said impaling prongs.

4. In a molding machine, a receiving assembly comprising a support having a plurality of units, each provided with one or more impaling prongs arranged to impale a molded product, and means movable upwardly relative to the units for displacing the molded products from said impaling prongs.

5. In a button-making machine, a receiving assembly comprising a plate having a plurality of piercing units therein to receive buttons thereon, a stripper plate slidable vertically relative to said piercing units to displace the buttons therefrom, and means for moving the stripper plate relative to the first-mentioned plate.

6. In a machine for molding products, ejector mechanism comprising a plate, ejector rods, heads adjustably mounted in the plate, and screw-threaded connections between the rods and said heads for individual adjustment of the rods relative thereto, said heads being individually bodily removable from the plate for individual removal of the rods.

7. In a molding machine, the combination of a multiplicity of upper and lower molds, each upper mold having means for retaining a molded product therein, and each of said upper molds having an opening therein, an ejector rod arranged to be projected through each opening to remove the molded product from the mold, a support, an adjusting head screw-threaded into the support for each ejector rod and having the upper end portion of said rod extending therethrough and having a screw-threaded connection therewith for adjustment and individual removal therefrom.

8. A process of making articles comprising molding an article from a plastic material capable of being hardened and simultaneously with said molding thereof forming a hole therein with a web in said hole, ejecting said article after hardening from the mold onto an impaling prong of substantially the same size as the hole thereby removing the web from the hole by said prong during the impaling action.

9. A process of making buttons comprising molding the buttons from plastic material capable of being hardened and simultaneously with said molding thereof forming a plurality of holes in each button with webs formed in the holes, ejecting each button after hardening from the mold onto a plurality of impaling prongs of substantially the same size as the holes thereby removing said webs from the holes by the prongs during the impaling action.

10. A process of making buttons comprising molding the buttons from plastic material capable of being hardened and simultaneously with said molding thereof forming a plurality of holes in each button with webs formed in the holes, ejecting each button after hardening from the mold, holding the button in the same peripheral position as in the mold and against rotation after removal from the mold, and removing the webs from the holes while said button is held in said relative position.

11. A process of making buttons comprising simultaneously molding a plurality of buttons from plastic material capable of being hardened and simultaneously with said molding thereof forming a plurality of holes in each button with webs formed in the holes, ejecting the buttons after hardening from the mold, holding the buttons in the same peripheral position as in the mold and against rotation relative to each other after removal from the mold, and removing the webs from the holes while said buttons are held in said relative position.

12. A process of making buttons comprising molding the buttons from a plastic material capable of being hardened and simultaneously with said molding thereof forming holes in each button with webs formed in the holes, ejecting each button after hardening from the mold onto a plurality of impaling prongs of substantially the same size as the holes thereby removing said webs from the holes by the prongs during the impaling action, and thereafter forcibly removing the buttons from the impaling prongs.

ALEXANDER A. SCOTT, JR.